United States Patent [19]

Mileson

[11] Patent Number: 5,013,430
[45] Date of Patent: May 7, 1991

[54] DEVICE FOR SEPARATION AND TRANSPORT OF WASTE MATERIAL FROM POLLUTED LIQUID

[76] Inventor: Ola Mileson, Elledalsgatan 9, SE-385 00 Torsås, Sweden

[21] Appl. No.: 382,735

[22] Filed: Jul. 19, 1989

[30] Foreign Application Priority Data

Mar. 18, 1988 [SE] Sweden ................................ 8800995

[51] Int. Cl.$^5$ ............................................. B01D 33/00
[52] U.S. Cl. .................................... 210/159; 210/162; 210/388; 210/413
[58] Field of Search ............... 210/154, 159, 162, 237, 210/391, 396, 415, 388, 389, 413

[56] References Cited

U.S. PATENT DOCUMENTS

| 4,184,957 | 1/1980 | Botsch | 210/159 |
| 4,792,394 | 12/1988 | Rudzinski | 210/159 |
| 4,853,116 | 8/1989 | Wallander | 210/104 |

FOREIGN PATENT DOCUMENTS 161398 6/1905 Fed. Rep. of Germany ...... 210/162
WO86/07106 12/1986 PCT Int'l Appl. .

*Primary Examiner*—Robert A. Dawson
*Assistant Examiner*—Matthew O. Savage
*Attorney, Agent, or Firm*—Horst M. Kasper

[57] ABSTRACT

A device for the separation and transport of material from polluted medium, for example waste water, comprises a grate (5) mounted in a support structure (1). The grate is composed of a series of stable rods (3) and adjustable rods (4), where the stable and adjustable rods are respectively joined and form a unit. Said unit is disposed in the grate (5). The grate (5) is provided with or without three wave-shaped shelves (6, 7, 8). One shelf (6) is disposed at the bottom of the device just below the surface of the medium, and the other two shelves (7, 8) are disposed at the top of the device, with the shelf (7) being mounted at about the surface of the medium. The edges of the rods (3, 4) having the shelves are turned against the direction of flow of the medium. The adjustable rod unit (4) is disposed so as to be driven up and down by a piston (8'). The piston (8') is suspended on a rail (10) mounted in the support structure (1). The movement proper is being performed by a wheel (15). The wheel (15) is mounted in four two-track steerings (11, 12) disposed at the support structure (1) and said wheel (15) presses down a stop (14).

6 Claims, 3 Drawing Sheets

DEVICE FOR SEPARATION AND TRANSPORT OF WASTE MATERIAL FROM POLLUTED LIQUID

BACKGROUND OF THE INVENTION

1. Field of the Invention

This invention relates to a device for the separation and transport of material from polluted media, for example, waste water.

2. Brief Description of the Background of the Invention Including Prior Art

A device, known from Swedish Patent SE-8,502,582-3, comprises a grate with stable and adjustable rods, where the edges of the rods, turned against the direction of the flow of water, are in stair-step form. The adjustable rods are joined together to form at least one unit. This unit is influenced by a drive mechanism which imparts to the adjustable rods a closed movement path mainly in the plane of the rods. The raised movement component of the rods is slightly greater than the height of the step of the stable rods. The stable and/or unstable rods are at least partially provided with saw teeth on their edges turned relative to the stair-step-shaped side.

Swedish Patent SE-8,204,128-8 teaches a unit of adjustable rods which is influenced by a mechanism consisting of arms supporting an excenter disk.

It is also known to transport material by means of so-called ledges or shelves by way of two identical means, where one means is put into rotary movement by an excenter or a crank axle and the material is transported from one shelf to another. This arrangement is used, for example, in thrashing machines used for grain harvesting or in other industries and places where such a technique is required.

In all of the aforementioned cases, the transport of material occurs by means of a rotary excenter or a crank axle, and is therefore dependent on the diameter and the form of the shaft.

SUMMARY OF THE INVENTION

1. Purposes of the Invention

It is an object of the invention to provide a device which is not dependent on short transport moments.

It is a further object of the invention to increase transport moments between the different ledges or shelves by means of a piston system or a rack method.

It is yet a further object of the invention to simplify the device in order to provide a more economical production thereof.

These and other objects and advantages of the present invention will become evident from the description which follows.

2. Brief Description of the Invention

The present invention provides for a device for the separation and transport of material from polluted liquid medium and comprises a support structure. A grate is mounted in the support structure and comprises a series of stable and adjustable rods. Every other rod of respective stable and adjustable rods is joined together to each respective unit and is arranged in the grate. The edges of the rods include are wave-shaped shelves and turned against the direction of flow of the medium. Three shelves are provided to be associated with the grate. The first shelf is positioned at the bottom of the device just under a surface level of the medium. The second shelf and the third shelf are arranged at the top of the grate, with the second shelf being mounted at about the surface level of the medium. A rail is mounted in the support structure. A trolley is supporting the first wheel and is attached to the rail. A piston is suspended in the trolley and said piston is to be driven up and down. The adjustable rod unit is attached to the piston. Four two-track steerings are positioned at the support structure. A second wheel is provided for performing a proper movement. Said second wheel is arranged to press down the stop and is mounted in the four two-track steerings. The steering is arranged to give two tracks, one track being used for ascent lifting material from one shelf to another, and the other track being used for descent drawing-in said shelf in the adjustable rod unit and in down position projecting said adjustable rod unit to transport position.

The liquid medium can be waste water. The piston can be driven hydraulically or pneumatically.

The novel features which are considered as characteristic for the invention are set forth in the appended claims. The invention itself, however, both as to its construction and its method of operation, together with additional objects and advantages thereof will be best understood from the following description of specific embodiments when read in connection with the accompanying drawing.

BRIEF DESCRIPTION OF THE DRAWING

In the accompanying drawing, in which are shown several of the various possible embodiments of the present invention.

DESCRIPTION OF INVENTION AND PREFERRED EMBODIMENT

Figure 1:
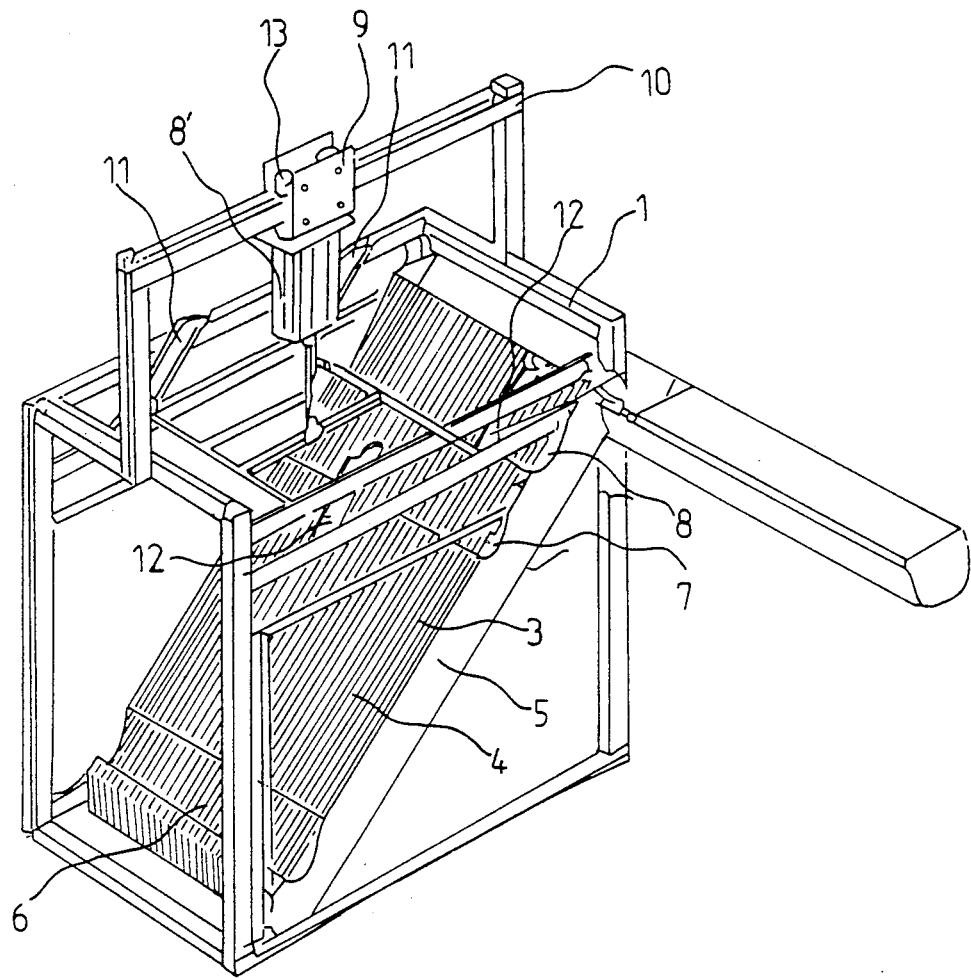
FIG. 1 is a side view of the device.
Figure 2:
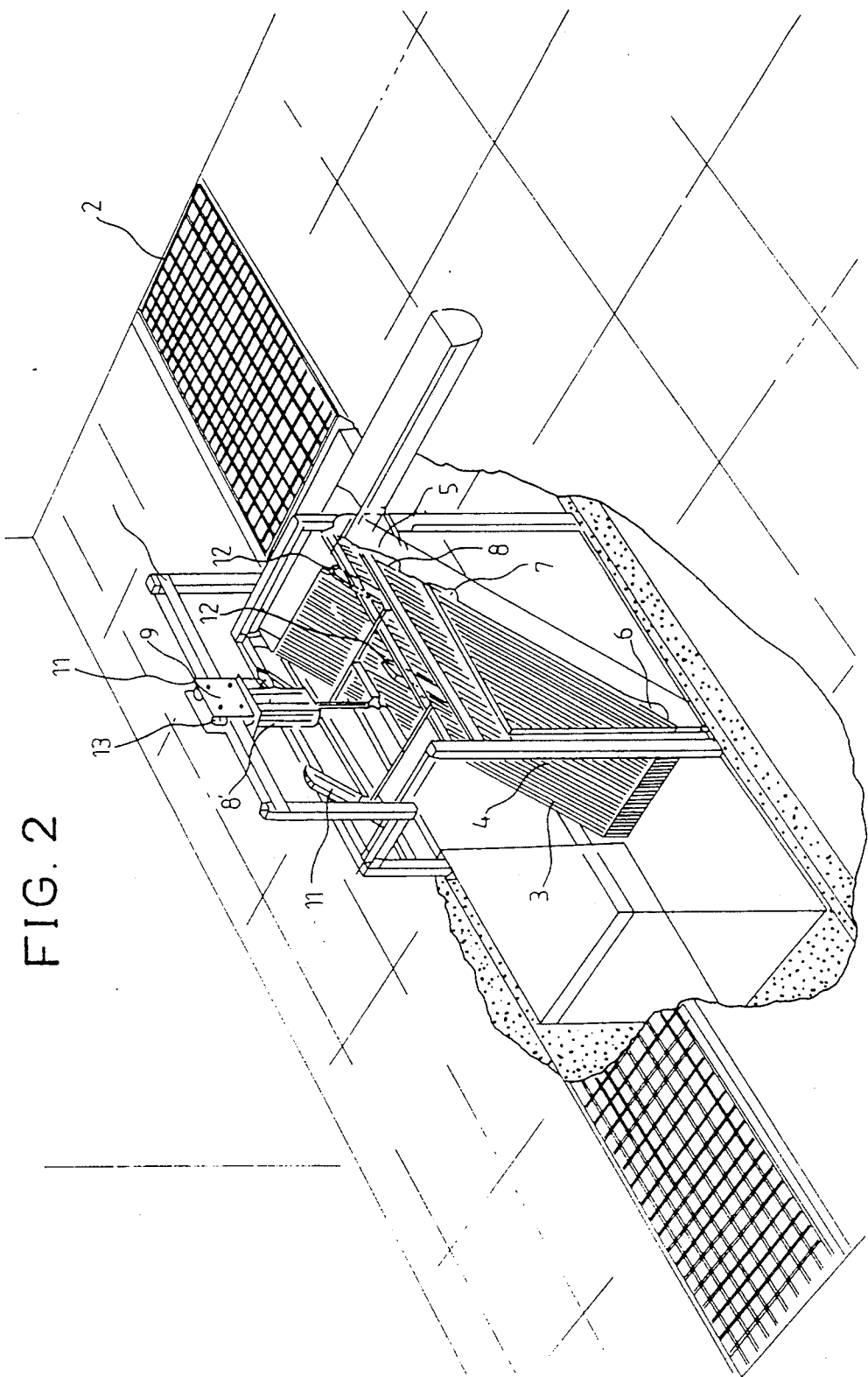
FIG. 2 shows the location where the device is put in operation, for example a canal.
Figure 3:
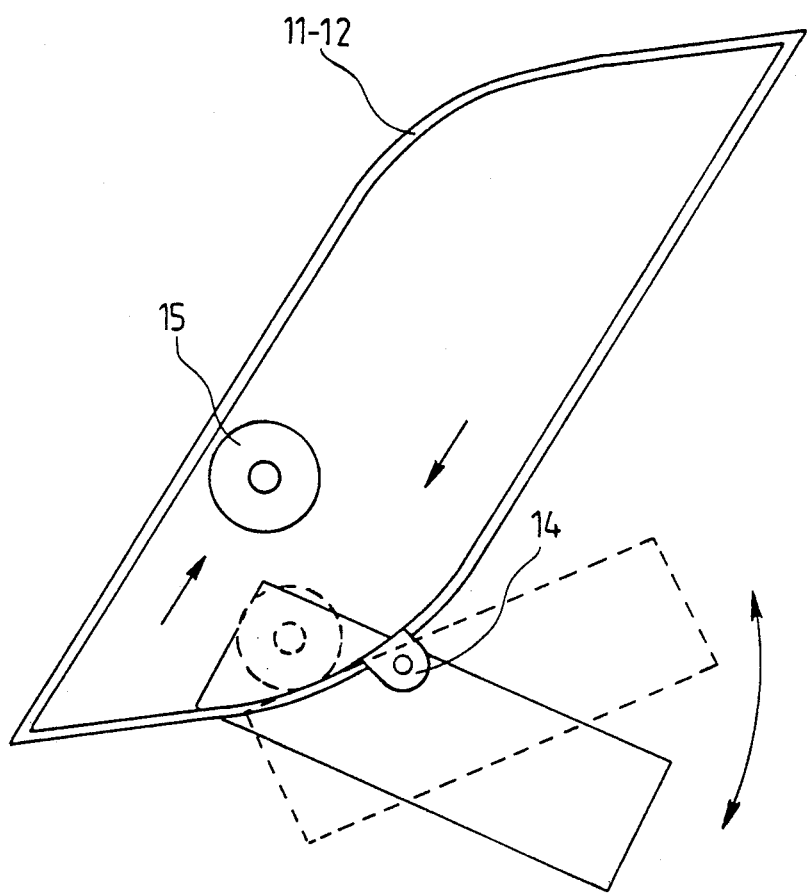
FIG. 3 shows the proper guide.

In accordance with the present invention, there is provided a device for the separation and transport of material from polluted liquid medium. The device comprises a support structure 1 disposed in a grate 5. The grate 5 is comprised of a series of stable rods 3 and adjustable rods 4. The rods are made out of flat iron. The rods 3 and 4 have the same appearance, where their wave-shaped shelves 6, 7, 8 edges are turned against the direction of flow of the water. Each rod 3 and 4, respectively, is joined together to form a unit. The grate 5 is provided with or without the three ledges or shelves 6, 7, 8. The shelf 6 is disposed at the bottom of the device just under the surface of the water. The shelves 7 and 8 are disposed at the top of the device, where the shelf 7 is mounted at about the surface of the water. In other words, no shelves are arranged in the larger part of the flow operation. The flow of the water causes solid pollutants to form a mass, which mass remains on the rods without the use of stair-steps or saw-teeth, which can lead to negative influence, as material is impeded in its sieve effect. The adjustable rod unit 4 is pneumatically or hydraulically driven up and down by a piston 8'. The piston 8' is suspended in a trolley 9. The trolley 9 is attached in a rail 10 mounted in the support structure 1. The work operation is controlled by a steering 11. The steering 11 automatically furnishes two tracks to said trolley 9. The first track is used for ascent lifting material from one shelf to another. The second track is used for descent drawing-in the shelf into the adjustable rod unit 4 and, in down position, projecting said unit 4 to transport position. The transporting adjustable rod unit 4 is suspended in four two-track steerings 11 and 12 by means of a wheel 15, while the piston 8', suspended on the rail 10, is provided with a joint that takes up the gauge on the position of the tracks in relation to the center of the shaft in the suspension of the piston 8', or if the piston 8', as described above, is suspended in a trolley. When the transporting adjustable rod unit 4 is in a raised or lowered position, there is mounted a weighted stop 14, which stop 14 is pressed down by a wheel 15, and returns to its normal position after the wheel 15 has passed, thus eliminating the possibility that the unit can take the wrong track in the transport as shown in FIG. 3.

It will be understood that each of the elements described above, or two or more together, may also find a useful application in other types separation and transport devices differing from the types described above.

While the invention has been illustrated and described as embodied in the context of a device for separation and transport of waste material, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A device for the separation and transport of material from polluted liquid medium, comprising
    a support structure;
    a grate mounted in the support structure and comprising a series of stable and adjustable rods, every other rod in the gate of respective stable and adjustable rods being joined together to form a respective unit, and wherein the edges of the rods include three wave-shaped shelves turned against the direction of flow of the medium;
    a first shelf provided to the grate;
    a second shelf provided to the grate;
    a third shelf provided to the grate, where the first shelf is positioned at the bottom of the grate just under a surface level of the medium, and the second shelf and the third shelf are arranged at the top of the grate, with the second shelf mounted at about the surface level of the medium;
    a rail mounted in the support structure and disposed above the grate;
    a first wheel;
    a trolley supporting the first wheel and being attached to the rail with the first wheel running along the rail;
    a piston suspended in the trolley and said piston to be driven up and down, wherein the adjustable rod unit is attached to the piston;
    four two-track steerings positioned at the support structure grate, each said two track steering including a stop;
    a second wheel attached to the adjustable rod unit for performing a proper movement, which second wheel is arranged to press down the stop and which second wheel is mounted in the four two-track steerings, wherein each said steering is arranged to give two tracks, one track being used for ascent lifting the adjustable rod unit and the material thereon from one shelf to another, and the other track being used for descent drawing-in said shelf into a transport position.

2. The device according to claim 1, wherein the liquid medium is waste water.

3. The device according to claim 1, wherein said piston is driven hydraulically.

4. The device according to claim 1, wherein said piston is driven pneumatically.

5. A device for the separation and transport of material from polluted medium comprising
    a grate (5) which is mounted in a support structure (1) and is composed of a series of stable rods (3) and adjustable rods (4), wherein every other rod in the grate of respective stable and adjustable rods is joined together to form a respective unit, wherein the edges of the rods are provided with or without three wave-shaped shelves (6, 7, 8), wherein one shelf (6) is positioned at the bottom of the grate just under the surface of the medium, and wherein the two other shelves (7, 8) are arranged at the top of the grate, with the middle shelf (7) being mounted at about the surface of the medium, wherein the shelves are turned against the direction of flow of the medium, wherein the unit, formed by the adjustable rod (4), is arranged to be driven up and down by a piston (8') suspended in a trolley (9), wherein the trolley (9) is provided with a first wheel (13) and attached in a rail (10), mounted in the support structure (1) above said grate, wherein the proper movement is performed by a second wheel (15) arranged to press down a stop (14), the second wheel and the stop being mounted in four two-track steerings (11, 12) positioned at the support structure (1) above said grate, and wherein the respective steering (11 and 12) is arranged to furnish two tracks, wherein one track is used for an upward lifting of the adjustable rod unit and the material thereon from one shelf to another and the other track is used for a downward motion and a drawing-in of said shelf in the adjustable rod (4) unit into a transport position.

6. The device according to claim 5, wherein said piston (8') is driven hydraulically or pneumatically.

* * * * *